(12) United States Patent
Mori et al.

(10) Patent No.: US 6,382,285 B1
(45) Date of Patent: May 7, 2002

(54) PNEUMATIC TIRE WITH HIGH HARDNESS RUBBER SHEET BETWEEN CARCASS PLIES

(75) Inventors: Shinichi Mori; Daisuke Kanenari, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 94 days.

(21) Appl. No.: 09/635,756

(22) Filed: Aug. 9, 2000

(30) Foreign Application Priority Data

Aug. 11, 1999  (JP) ............................................ 11-227526

(51) Int. Cl.$^7$ ............................. B60C 1/00; B60C 9/02; B60C 9/04; B60C 9/06; B60C 9/18; B60C 3/04
(52) U.S. Cl. ...................... 152/454; 152/458; 152/532; 152/549; 152/559; 152/564; 152/565
(58) Field of Search ................................. 152/532, 549, 152/454, 458, 559, 564, 565

(56) References Cited

U.S. PATENT DOCUMENTS 3,067,795 A * 12/1962 Neuville et al. ............ 152/549

FOREIGN PATENT DOCUMENTS

JP            06255304 A * 9/1994 .................. 152/549

* cited by examiner

Primary Examiner—Adrienne C. Johnstone
(74) Attorney, Agent, or Firm—Rader, Fishman & Grauer, PLLC

(57) ABSTRACT

A pneumatic tire having at least two or more pieces of carcasses, wherein a high hardness rubber component sheet, which has tensile stress of 2.0 MPa or more when extended by 20% to a tire circumferential direction and JIS-A hardness of 65 or more, is arranged at least between carcass plies at a tread portion.

10 Claims, 1 Drawing Sheet

PNEUMATIC TIRE WITH HIGH HARDNESS RUBBER SHEET BETWEEN CARCASS PLIES

BACKGROUND OF THE INVENTION

The present invention relates to a pneumatic tire, more particularly to a pneumatic tire such as a pneumatic racing cart tire that is used for a go-cart (a simple structured small automobile with an engine).

In a bias racing tire having at least two carcass plies, particularly a racing cart tire of a small outer diameter (300 mm or smaller, for example) and a small aspect ratio (55% or smaller, for example), it is a subject for improving driving stability and high-speed durability of a tire how the expansion of a contact portion (that is, a cap tread portion) due to the centrifugal force at high-speed running is suppressed. As a method for solving such a subject Japanese patent application Kokai publication Nos. 4-283106 and 4-189603, for example, propose a method for providing a belt on a carcass of the contact portion. However, since the use of such a radial structure for the racing cart tire is prohibited by a competition rule of the racing cart, such a method cannot be used, and other methods must be taken. Moreover, Japanese patent application Kokai publication No. 8-244403 discloses a technology of increasing the number of plies to 3, but this technology has a disadvantage of increasing a tire weight and, in addition, of increasing a cost, which is not ignorable. Therefore, this technology is not preferable.

Japanese patent application Kokai publication No. 6-255304 discloses a technology of providing a rubber sheet between the carcass plies at the contact portion for reinforcement thereof. This technology is constituted so as to use only, and shows a certain extent of effect. But the technology cannot effectively solve problems of expansion of the tire contact portion due to the centrifugal force at high-speed running and generation of heat at the tire contact portion yet.

SUMMARY OF THE INVENTION

The object of the present invention is to eliminate the above-described problems of the conventional pneumatic bias racing tire, and to improve driving stability, mainly stability on straight running at high-speed running of a pneumatic bias racing tire and high-speed durability thereof by improving rigidity of the tire contact portion to suppress expansion of the tire contact portion due to the centrifugal force at high-speed running.

In order to achieve the foregoing object, according to the present invention, a pneumatic tire having at least two carcass plies is provided, wherein a high hardness rubber component sheet with tensile stress of 2.0 MPa or more when extended by 20% to a tire circumferential direction and JIS-A hardness of 65 or more is arranged at least between carcass plies at a tread portion.

DESCRIPTION OF THE PREFERRED EMBODIMENTS

Figure 1:
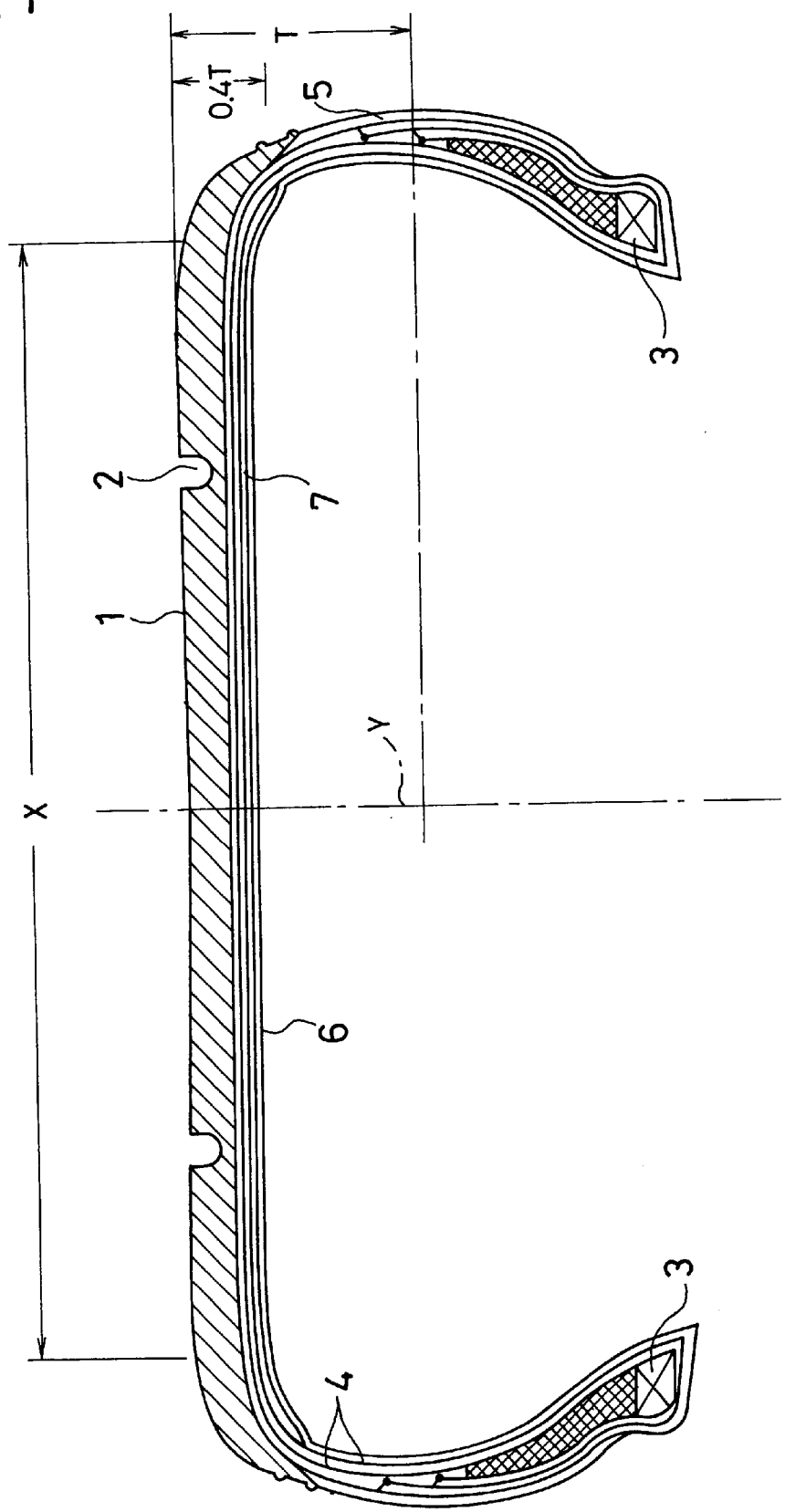
FIG. 1 is a cross-sectional view along the meridian direction showing an example of a bias racing tire according to the present invention.

In FIG. 1, a pneumatic bias racing tire comprises: a tread portion 1 having small holes 2 for wear check; a pair of bead cores 3 and 3; a carcass 4; a sidewall 5; an air permeation prevention layer 6; and a sheet layer 7 of a high hardness rubber composition. Reference code X denotes a tire contact width and code Y denotes a tire centerline (a tire equator line). In other words, in FIG. 1, edge portions of two pieces of carcasses 4 and 4 are respectively folded over and rolled up around a pair of bead cores 3 and 3 from tire inside to outside thereof, and a sheet layer 7 of a high hardness rubber composition is arranged between the plies of the two pieces of carcasses 4 and 4 at the tread portion 1. FIG. 1 shows two pieces of carcasses 4, but they may be three or more pieces. Two pieces are preferable from the weight point of view.

Here, area of the tread portion 1 is decided by a distance of a tire diameter direction in the case where the tire is installed on a standard rim and is inflated to a standard inner pressure. When a distance from a tire width maximum position to a tire tread top position is set as T, the area of the tread portion 1 means an area of 0.4 T from the tread top position to the tire width maximum position direction. Note that the standard rim and the standard inner pressure mean a rim and a pressure specified by 1998 year book of Japan Automobile Tire Manufacturer Association, Inc. (JATMA).

The sheet layer 7 of the high hardness rubber composition may be arranged between the carcass plies as shown in FIG. 1, but alternatively, in addition to between the carcass plies, it may be arranged inside of the innermost carcass and/or outside of the outermost carcass.

An arrangement width of the high hardness rubber composition 7 is preferably 90% to 120% of the tire contact width X having the tire center line Y as a center, more preferably 100% to 110% thereof. If the arrangement width is smaller than 90% of the contact width X, effect of rigidity improvement at the tread contact surface is low, and if it exceeds 120% thereof, a disadvantage of tire weight increase occurs, which are not preferable. The tire contact width X is the one in the case where the tire is installed on the standard rim and is inflated to the standard inner pressure.

An average thickness of the high hardness rubber composition 7 is preferably 0.2 to 3.0 mm. If the thickness thereof is smaller than 0.2 mm, effect of rigidity improvement is small, and if it exceeds 3.0 mm, a disadvantage of weight increase occurs and high-speed durability reduces, which is not preferable.

The high hardness rubber composition constituting the sheet 7 has the tensile stress of 2.0 MPa or more, preferably 3.0 MPa to 10 MPa, when it is extended by 20% to the tire circumferential direction under the temperature of 25° C., and has JIS-A rigidity of 65 or more, preferably 70 to 99.

The reason why "the tensile stress when it is extended by 20% to the tire circumferential direction" is set as a standard is that distortion given to the tire tread contact portion during running is generally considered to be around 20%. If the tensile stress is smaller than 2.0 MPa, the tire circumferential direction rigidity at the tread contact portion is insufficient, thus effect of suppressing expansion of the tire contact portion due to the centrifugal force during high-speed running, that is, a tread rise, is not produced.

(1) As the high hardness rubber composition constituting the sheet 7, for example, a rubber composition as follows may be used. Total 100 parts by weight of rubber that includes 50 parts by weight, preferably 60 to 100 parts by weight, of ethylene unsaturated nitrile-conjugated diene series high saturated rubber that includes 30% by weight or less, preferably 25% by weight or less, of conjugated diene unit, is blended with zinc methacrylate of 40 to 120 parts by weight, preferably 50 to 120 parts by weight, and carbon black of 0 to 50 parts by weight, preferably 0 to 30 parts by weight, and a total amount of the zinc methacrylate and the carbon black is 40 to 120 parts by weight, preferably 50 to 120 parts by weight.

As the ethylene unsaturated nitrile-conjugated diene series high saturated rubber, copolymer between ethylene unsaturated nitrile such as acrylonitrile and methacrylonitrile and conjugated diene such as 1,3-butadiene, isoprene and 1,3-pentadiene can be listed. Moreover, monomer that can interpolymerize with these two monomers, for example vinyl aromatic compound, multiple copolymer such as (meth-) acrylic acid, alkyl (meth-) acrylate, alkoxyalkyl (meth-) acrylate, cyanoalkyl (meth-) acrylate, for example, acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, and acrylonitrile-butadiene-acrylate-methacrylic acid copolymer rubber can be listed.

These rubbers include ethylene unsaturated nitrile unit by, preferably, 50 to 60% by weight, and conjugated diene unit is made to be 30% by weight or less, preferably 20% by weight or less, by means such as partial hydrogenation of the conjugated diene. If the amount of the conjugated diene is included too much, reinforcement effect by zinc methacrylate is insufficient, thus target rigidity cannot be obtained, which is not preferable. On the other hand, sufficient reinforcement effect cannot be obtained if the amount of ethylene unsaturated nitrile unit is less than 30% by weight. If the amount is too much, rubber loses elasticity and adhesiveness thereof with surrounding rubber is apt to become worse, which is not preferable.

Zinc methacrylate in which large particles are removed, that is, large particles of 2.0 mm or larger in diameter are excluded by air classification is preferable. The used amount thereof is 40 to 120 parts by weight, preferably 50 to 120 parts by weight for 100 parts by weight of rubber. If the amount is too much, the rubber component becomes too stiff, which causes ride comfort performance to reduce, which is not preferable.

The amount of carbon black, which is optionally used, is 0 to 50 parts by weight, preferably 0 to 30 parts by weight. If the blend amount is too much, heat generation property will increase, which may influence durability of the tire, which is not preferable. With regard to the high hardness rubber component of the present invention, various kinds of chemicals regularly used in the rubber industry may be used for mixture if necessity arises as long as the object of the present invention is not lost. Such chemicals are: filler such as silica, calcium carbide and talc; crosslinker such as organic peroxide; crosslinker auxiliary such as triallyl isocyanurate, trimethylolpropane triacrylate, m-phenylene bismaleimido; plasticizer; stabilizing agent; processing aid; and coloring matter.

If total amount of zinc methacrylate and carbon black is too small in the high hardness rubber component of the present invention, reinforcement effect becomes too small to achieve the desired object. On the contrary, if the amount is too much, the rubber component becomes too stiff, which causes ride comfort to be defective, which is not preferable.

(2) The high hardness rubber component constituting the sheet 7, consists of blend of at least one kind of 100 parts by weight of rubber and 1 to 30 parts by weight of short fiber, and the short fiber may be arranged to the tire circumferential direction.

Regular methods can be taken in order to align the short fiber to the tire circumferential direction. For example, a rubber sheet is manufactured by rolling or extrusion, and the rubber sheet may be adhered on a green tire by making an extrusion direction parallel to the tire circumferential direction.

As rubber to be used, the followings can be listed: Diene series rubber and its hydrogenated rubber (for example, natural rubber (NR), polyisoprene rubber (IR), epoxy natural rubber (ENR), styrene-butadiene copolymer rubber (SBR), polybutadiene rubber (high cis-BR and low cis-BR); nitrile rubber (NBR), hydrogenated NBR, hydrogenated SBR); various kinds of elastomer such as olefin series rubber (for example, ethylene propylene rubber (EPDM, EPM); maleic acid modified ethylene propylene rubber (M-EPM), butyl rubber (IIR); and copolymer between isobutylene and aromatic family vinyl or diene series monomer); halogen-containing series rubber (bromine butyl rubber (Br-IIR), chlorinated butyl rubber (Cl-IIR), bromine of isobutylene paramethylstylene copolymer (Br-IPMS), chlorosulfonated polyethylene (CMS), chlorinated polyethylene (CM), maleic acid modified chlorinated polyethylene (M-CM)); and thermoplastic elastomer (for example, styrene series elastomer, olefin series elastomer, ester series elastomer).

It is preferable that short fiber which consists of at least two kinds of polymers is used, in which a short fiber (A) having a sea-island structure at a sectional surface of fiber is fibrillated into a short fiber (A') with a mechanical shearing through mixture with rubber. Following short fibers (A) can be used in the present invention: polyester; polyvinyl alcohol, nylon; polyethylene; polypropylene; cellulose; polybutadiene; aromatic family polyamide; rayon; polyallylate; polyparaphenylene benzbisoxazole; and polyparaphenylene benzbisthiazole.

As described above, by using the short fiber (A) that can be fibrillated, aspect ratio of the short fiber (a value obtained by dividing a fiber length by a diameter of a circle which is equivalent to a fiber cross section area) is decreased at the time of addition of the fiber, entanglement of the fibers is suppressed to improve dispersion to the rubber, subsequently, mechanical shearing force is applied in order to separate sea elements and island elements in pieces into fibrillation, and a contact area between the fibrillated short fiber (A') and the rubber is increased, thus improving the reinforcement effect of the sheet 7. Note that the short fiber (A) may be separated into the ones having a small diameter across the whole section, or the short fiber (A) of only a peripheral area and both end portions may be separated into the ones having a small diameter leaving a trunk portion.

A preferable example of the short fiber (A) consists of at least polyvinyl alcohol series polymer (X) and water-insoluble polymer (Y), weight ratio X/Y is set at 90/10 to 20/80, and the sea-island structure is formed by making either of X and Y the island element and another the sea element at the sectional surface. This short fiber (A) forms the sea-island structure by combination of polyvinyl alcohol series polymer (X) as water-soluble polymer and water-insoluble polymer (Y) that does not dissolve when it is soaked in water of normal temperature such as cellulose acetate and starch. The polyvinyl alcohol series polymer has high hardness and superior affinity with rubber. If the above-described short fiber contains more than 90% by weight of polyvinyl alcohol series polymer (X), the fiber is not separated even by the mechanical shearing force due to rubber kneading. On the contrary, if the short fiber contains less than 20% by weight thereof, the fiber reinforcement effect cannot be obtained. When the blend amount of the short fiber is too small, the reinforcement effect becomes small and the desired object cannot be achieved, and when the blend amount is too much, processing property of rubber becomes worse, which is not preferable.

(3) In order to improve adhesion between the sheet 7 of the high hardness rubber component and the carcass 4 adjacent thereto, an adhesive agent component layer having the following blend may be arranged. Total 100 parts by weight rubber obtained by combining at least one kind of rubber (A) selected from rubbers conventionally and regularly used for tire such as natural rubber, polyisoprene rubber, polybutadiene rubber and conjugated diene-aromatic family vinyl copolymer rubber (for example, styrene-butadiene copolymer rubber) and acrylonitrile-butadiene copolymer rubber (B) (weight ratio (A)/(B)=80:20 to 20:80 is preferable) is blended with (C) aromatic family petroleum resin of 5 to 80 parts by weight, preferably 10 to 60 parts by weight, with average molecular weight of 300 to 1500, preferably 500 to 1500, softening point of 50 to 160° C., preferably 70 to 160° C., iodine adsorption amount of 20 g/100 g or more, preferably 30 g/100 g or more.

If the blend amount of aromatic family petroleum resin (for example, product name of FR-120 sold by Fuji Chemical Industries, Ltd.) in the adhesive agent component layer is too small, adhesion becomes small and processing property of rubber becomes defective, which is not preferable. On the contrary, if the blend amount is too much, heat generation becomes large, which may influence durability of tire, which is not preferable.

(4) With regard to the high hardness rubber component of the present invention, an optional compounding agent that is regularly used in the rubber industry such as softening agent, ageing preventive, vulcanization accelerator, filler, plasticizer, in addition to the essential ingredients as described above, can be blended within a regular blend amount range according to necessity. Moreover, a manufacturing method of the pneumatic bias racing tire of the present invention can be executed in the conventional method without changing anything but the use of the high hardness rubber sheet.

The pneumatic tire of the present invention is particularly preferable for a racing cart bias tire with an outer diameter of 300 mm or less, more preferably 270 to 290 mm, and an aspect ratio of 55% or less, more preferably 50% or less. In a tire having a low aspect ratio, particularly of 55% or less, stronger tread portion reinforcement is required in order to maintain the tire shape when an inner pressure is filled. For further reinforcement of the tread portion, another reinforcement layer may be arranged. It is desirable that the reinforcement layer is arranged on the whole tread portion, and its width may be 90% to 120% of the tire contact width X having the tire center line Y as a center. If the width thereof exceeds 120%, which is too wide, the reinforcement layer reaches the side portion area and it is not desirable from the durability point.

The present invention will be further described with reference to embodiments, but it is needless to say that the scope of the present invention is not limited to these embodiments.

Embodiment 1

A high hardness rubber component with a blend ratio as shown in the following table (part by weight per 100 parts by weight of rubber (phr)) was used as the sheet 7 in FIG. 1.

| Ingredient | Blend amount (phr) |
| --- | --- |
| SBR (Nipol 1502, Zeon Corporation) | 10 |
| Hydrogenated NBR (Zetpol 2020, Zeon Corporation) | 90 |
| Zinc methacrylate (R-20S, Asada Chemical Industry Co., Ltd.) | 70 |
| Carbon black (FEF class) (HTC-100, Chubu Carbon) | 10 |
| Ageing preventive (Nowguard 445, Uniroyal Chemical Co., Ltd.) | 1.5 |
| Organic peroxide (40% diluted) (Perkadox 14/40, Kayaku Akuzo Corporation) | 5 |
| Co-crosslinker (TAIC, Nihon Kasei Co., Ltd.) | 2 |

(Notice) Tensile stress of the rubber composition when it was extended by 20% to the tire circumferential direction was 5.6 MPa.

First, the above blend ingredients other than organic peroxide and co-crosslinker were mixed in a 3.6 liter-sealed Bunbury mixer at 60° C. for 5 minutes, and organic peroxide and co-crosslinker were subsequently mixed in an oven roll to obtain a crosslinker sheet. Hardness of the sheet was 91, tensile stress when it was extended by 20% to the tire circumferential direction was 5.6 MPa, and a thickness thereof was 1.0 mm.

The high hardness rubber component sheet obtained with the above-described procedure was provided between carcass plies of a tire in 105% of the tire contact width, and the adhesive agent component layer blended as follows (thickness of 0.5 mm) was further arranged, thus adhesion between the carcass and the high hardness rubber component sheet was reinforced. The blend ratio of the adhesive agent component layer is as follows.

| Ingredient | Blend amount (phr) |
| --- | --- |
| NR (RSS#3) | 50 |
| NBR (Nopol DN401, Zeon Corporation) | 50 |
| Carbon black (HAF class) (N330T, Showa Cabot Co., Ltd.) | 50 |
| Ageing preventive (NOCRAC 224, Ouchi Shinko Industrial Co., Ltd.) | 1 |
| Aromatic family series petroleum resin (FR-120, Fuji Chemical Industries Ltd.) | 30 |
| Zinc white (Zinc white No.3, Seido Chemical Industry Co., Ltd.) | 5 |
| Stearate (Bead stearate, NOF Corporation) | 1 |
| Co-crosslinker (TAIC, Nihon Kasei Co., Ltd.) | 3 |
| Organic peroxide (40% diluted) (Perkadox 14/40, Kayaku Akuzo Corporation) | 5 |

The high hardness rubber component sheet obtained with the above-described ingredients was tested for driving stability and high-speed durability. Table I shows the results. Note that the same tests were performed for a tire of the conventional structure (that is, a pneumatic tire formed according to embodiment 1 except for the use of the high hardness rubber sheet of the present invention) as a comparative experiment.

The result is shown in Table I. The test method is as follows.

Driving Stability Evaluation Conditions
    Tire size:
        front 4.5×10–5
        : rear 7.1×11.0–5
    Test course: circuit (614 m/circuit in Tochigi)
    Test machine: TECNO (made in Italy)
    Engine: YAMAHA
    Test method: One driver drives the course for 7 laps, and takes data of drivability and time. The same test is repeated 3 times by using the same tire.

Drivability evaluation: Marks are given in 10 points, and an average of 3 tests is taken.

Chassis Test Evaluation Conditions

Tire size: 7.1×11.0–5

Air pressure: 130 KPa

Evaluation machine: Drum testing machine

Conditions: Test conditions according to a high-speed test in 1998 year book of JATMA

TABLE I

| | Driving stability evaluation (index) | High-speed durability chassis test result (index) |
|---|---|---|
| Present invention (tire that has rubber component of 1 mm gauge of present invention provided between carcass plies in 105% of tire contact width) | 128 | 121 |
| Conventional structure | 100 | 100 |

Embodiment 2

The rubber component, in which a short fiber having a sea-island structure of two kinds of polymers at the fiber section surface were blended, was prepared in the following blend ratio.

| Ingredient | Blend amount (phr) |
|---|---|
| NR (RSS#3) | 100 |
| Short fiber (K-II SA, Kuraray Co., Ltd.) | 5 |
| Carbon black (FEF class) (HTC-100, Chubu Carbon) | 50 |
| Aromatic oil (Coumolex 300, Nippon Petroleum) | 10 |
| Zinc white (Zinc white No.3, Seido Chemical Industry Co., Ltd.) | 5 |
| Stearate (Bead stearate, NOF Corporation) | 1 |
| Ageing preventive (NOCRAC 224, Ouchi Shinko Industrial Co., Ltd.) | 1 |
| Sulfur (HSOT-20, Flexis) | 2 |
| Vulcanization accelerator (NOCCELER-NS-F, Ouchi Shinko Industrial Co., Ltd.) | 1 |

(Notice) Tensile stress of the rubber composition when it was extended by 20% to the tire circumferential direction was 3.7 MPa.

First, above blend ingredients other than organic peroxide and co-crosslinker were mixed in a 3.6 liter sealed Bunbury mixer at 60° C. for 7 minutes in total, and organic peroxide and co-crosslinker were subsequently mixed in an oven roll to obtain a crosslinker sheet. Hardness of the sheet was 78, tensile stress thereof when it was extended by 20% to the tire circumferential direction was 3.7 MPa, and a thickness thereof was 1.0 mm.

The high hardness rubber component sheet obtained with the above-described procedure was provided between carcass plies of a tire in 105% of the tire contact width.

The high hardness rubber component sheet obtained with the above-described ingredients was tested for driving stability and high-speed durability similar to embodiment 1. Table II shows the results. Note that the same tests were performed for a tire of the conventional structure (that is, a pneumatic tire formed according to embodiment 2 except for the use of the high hardness rubber sheet of the present invention) as a comparative experiment. The result is shown in Table II.

TABLE II

| | Driving stability evaluation (index) | High-speed durability chassis test result (index) |
|---|---|---|
| Present invention (tire that has rubber component of 1 mm gauge of present invention provided between carcass plies in 105% of tire contact width) | 123 | 117 |
| Conventional structure | 100 | 100 |

As described above, according to the present invention, rigidity of the tire contact portion is increased by arranging the high hardness rubber component sheet between the carcass plies, and driving stability, mainly stability on straight running, at high-speed running and high-speed durability thereof are improved.

What is claimed is:

1. A pneumatic tire having at least two carcass plies, wherein a high hardness rubber component sheet, which has tensile stress of 2.0 MPa or more when extended by 20% to a tire circumferential direction and JIS-A hardness of 65 or more, is arranged at least between carcass plies at a tread portion.

2. The pneumatic tire according to claim 1, wherein said tensile stress is 3.0 MPa to 10 MPa and said JIS-A hardness is 70 to 99.

3. The pneumatic tire according to claim 1, wherein said high hardness rubber component sheet is also arranged inside of an innermost carcass ply and/or outside of an outermost carcass ply at the tread portion.

4. The pneumatic tire according to claim 1, wherein an arrangement width of said high hardness rubber component sheet is 90% to 120% of the tire contact width with a tire centerline as a center.

5. The pneumatic tire according to claim 1, wherein an average thickness of said high hardness rubber component sheet is 0.2 to 3.0 mm.

6. The pneumatic tire according to claim 1, wherein said high hardness rubber component is a rubber compound, in which 40 to 120 parts by weight of zinc methacrylate and 0 to 50 parts by weight of carbon black are blended with 100 parts by weight of rubber, which includes ethylene unsaturated nitrile-conjugated diene series high saturated rubber that includes 30% by weight or less of conjugated diene unit, and the total amount of zinc methacrylate and carbon black is 40 to 120 parts by weight.

7. The pneumatic tire according to claim 1, wherein said high hardness rubber component consists of 100 parts by weight of at least one kind of rubber, in which 1 to 30 parts by weight of short fiber is blended, and the short fiber is aligned to the tire circumferential direction.

8. The pneumatic tire according to claim 7, wherein said short fiber consists of at least two kinds of polymers, and said short fiber is prepared in which a short fiber (A) having a sea-island structure at a sectional surface of fiber is fibrillated into a short fiber (A') with a mechanical shearing through mixture with rubber.

9. The pneumatic tire according to claim 1, wherein an adhesive agent component layer, in which total 100 parts by weight rubber obtained by combining at least one kind of rubber (A) selected from natural rubber, polyisoprene rubber, polybutadiene rubber and conjugated diene-aromatic family vinyl copolymer rubber with acrylonitrile-butadiene copolymer rubber (B) is blended with aromatic family petroleum resin (C) of 5 to 80 parts by weight, with average molecular weight of 300 to 1500, softening point of 50 to 160° C. and iodine adsorption number of 20 g/100 g or more, is arranged between said high hardness rubber component sheet and carcass plies adjacent thereto.

10. The pneumatic tire according to any one of claims 1 to 9, wherein the tire is a racing cart bias tire having an outer diameter of 300 mm or less and an aspect ratio of 55% or less.

* * * * *